Aug. 7, 1962
E. A. HOLMES
3,048,136
ANTENNA COMPENSATING ELECTRODES FOR
USE IN DISSIPATIVE MEDIUM
Filed April 24, 1957
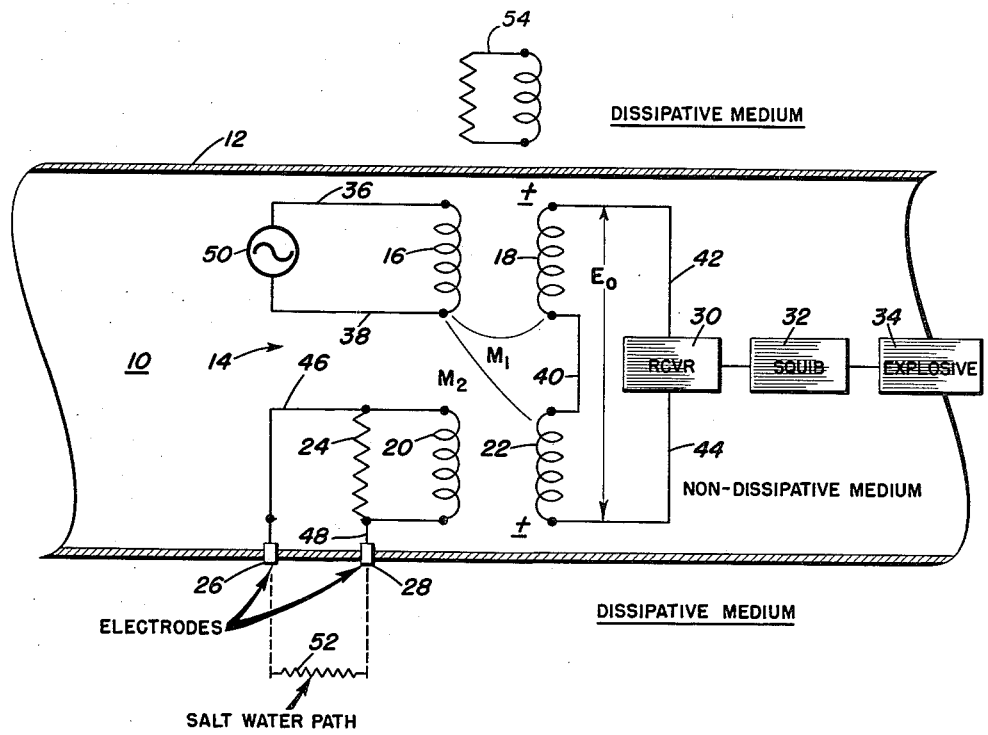
*ELMOND A. HOLMES*
INVENTOR
BY
ATTORNEYS 3,048,136
ANTENNA COMPENSATING ELECTRODES FOR USE IN DISSIPATIVE MEDIUM
Elmond A. Holmes, Fullerton, Calif., assignor to the United States of America as represented by the Secretary of the Navy
Filed Apr. 24, 1957, Ser. No. 654,974
4 Claims. (Cl. 114—20)

This invention relates generally to torpedo exploding devices, and more particularly it pertains to an antenna compensating electrode system for use as a part of a torpedo influence exploder.

It is an object of this invention to provide an antenna compensating electrode system for use with a torpedo influence exploder which utilizes compensating electrodes to allow the exploder to operate more effectively in a dissipative medium, such as sea water, which has a changing conductivity.

Still another object of this invention is to provide an antenna compensating electrode system for a torpedo influence exploder in which the electrodes keep the output of the A.C. bridge zero even though the conductivity of the dissipative medium, surrounding the bridge coils, changes.

And another object of this invention is to provide an arrangement and method for connecting antenna compensating electrodes in an electrical circuit for a torpedo influence exploder.

These and other objects and advantages of this invention will become more apparent from the following detailed description of the invention and single FIGURE of the accompanying drawing which shows a schematic of an antenna compensating electrode system which is used as part of a torpedo influence exploder.

Referring now to the single FIGURE of the drawing, there is illustrated a torpedo 10 having a cylindrical casing 12. The torpedo 10 is positioned in a dissipative medium, such as sea water, the inductive and resistive characteristics of said medium being symbolically represented by the R—L circuit 54.

On the inside of the torpedo casing 12 there is located a transmitter-detector system 14. The system 14 consists of four coils 16, 18, 20 and 22. Coil 16 is a radiating coil, and it is connected by leads 36 and 38 to a suitable transmitter 50.

Coils 18 and 22 are receiving coils for the system 14. These coils 18 and 22 are connected in opposition by a lead 40. The opposite ends of the coils 18 and 22 are connected by leads 42 and 44, respectively, to a conventional receiver 30. The output of receiver 30 is utilized in a firing circuit to ignite a squib 32 which, in turn, is used to set off a booster and an explosive 34.

Coil 18 is coupled close to coil 16. Coil 18 requires only a few turns of wire in order to generate a voltage equal to that in coil 22. In a practical embodiment of the invention, it is desirable that coil 22 have ten times as many turns of wire as coil 18 so that a large difference voltage will be generated by the target signal.

Coil 20 is coupled to receiving coil 22. It is shunted by a resistor 24 and by the resistance 52 of the sea water. Resistor 24 is located in a circuit including leads 46 and 48, coil 20, together with two electrodes 26 and 28. These electrodes 26 and 28 are located in the wall of the casing 12 and they are suitably insulated from each other as well as the torpedo casing 12.

In a practical embodiment of the invention, the voltage in coil 18, which as previously mentioned, is closely coupled to the transmitter coil 16, may be of the order of approximately 100 volts. In this case, the remotely located coil 22 will have a voltage of the order of approximately 100 volts because, as previously pointed out, coil 22 has ten times as many turns as coil 18 since it is located ten times as far from coil 16 as it is positioned from coil 18.

The turns-ratio balance between coils 18 and 22 will never be perfect, that is, zero. Hence, coil 20, which has the resistance 52 of the dissipative medium shunted thereacross, balances the detector system, so that, in operation, the transmitted field from the coil 16 is radiated to a suitable target (not shown) and the radiant energy reflected from the target is picked up by the coils 18 and 22.

These coils 18 and 22, due to the presence of coil 20, are at a potential with respect to coil 16, that is, coil 16 does not feed directly into coils 18 and 22. Coils 18 and 22, therefore, develop a voltage potential from a change in the field about the torpedo 10. The output signal from the coils 18 and 22 is fed to the receiver 30, as previously pointed out.

When a bucking coil detector system such as the one illustrated in the FIGURE is used in a dissipative medium, it is not possible to balance the voltage in the coils 18 and 22 exactly by adjusting the number of turns in each coil. The eddy current loop is coupled more closely to the coil 18 than to the coil 22. Therefore, this causes a slight difference in the phase between the voltage of coils 18 and 22. The result is that a signal in quadrature to the signal of a turns-ratio unbalance is obtained.

By coupling the coil 20, closely to the coil 16 and to the coil 22 with the resistor 24 across the terminals of the coil 20, this arrangement will compensate for the quadrature signal due to the eddy current loop.

By placing the fixed resistor 24 across the coil 20, it has been found that the compensation is good for only one value of the conductivity of the dissipative medium. By positioning the electrodes 26 and 28 in the dissipative medium across the coil 20, the resistance across this coil 20 depends on the conductivity of the dissipative medium.

This arrangement will allow the coil 20 to compensate for the eddy current loops over a range of conductivity of the dissipative medium, since both the resistance of the coil and the eddy current loop will depend on the conductivity of the dissipative medium. Presence of metal near the coils 16, 18, 20 and 22, requires some resistance across the coil 20 even in a non-dissipative medium, such as air. Therefore, for good compensation of the system, the previously mentioned fixed resistor 24 should be shunted across coil 20, with the electrodes 26 and 28 being located in shunt.

Obviously many modifications and variations of the present invention are possible in the light of the above teachings. It is therefore to be understood that within the scope of the appended claims the invention may be practiced otherwise than as specifically described.

What is claimed is:
1. In combination with a torpedo influence exploder; an antenna compensating electrode system for use in a dissipative medium, comprising, a torpedo casing, a transmitter-detector system located in said casing in a non-dissipative medium, said system including means having a first coil for transmitting a signal, a bucking coil detector including second and third coils connected in opposition, means including a fourth coil having a variable resistance means connected in shunt to compensate for changes in the conductivity of said dissipative medium, said first coil being coupled to said second coil and said third coil and said third coil being coupled to said fourth coil, said fourth coil maintaining the turns-ratio balance of said second and third coils at zero, a receiver connected to the output terminals of said second and third coils, and explosive means connected to the output of said receiver.
2. An arrangement as set forth in claim 1, wherein said variable resistance means includes a fixed resistance connected in shunt with said fourth coil to compensate for the normal conductivity of said dissipative medium and a pair of electrodes connected in shunt with said fourth coil and communicating with said dissipative medium to compensate for any conductivity changes therein.

3. An arrangement as set forth in claim 2, wherein the electrodes of said pair are insulated from each other and from said torpedo casing.

4. An arrangement as set forth in claim 1, wherein said third coil has ten times as many turns as said second coil and said third coil having substantially one tenth the coupling with said first coil as said second coil whereby the presence of a target will induce a voltage sufficient to initiate said exploder.

References Cited in the file of this patent

UNITED STATES PATENTS

| | | |
|---|---|---|
| 571,739 | Badt | Nov. 24, 1896 |
| 1,399,968 | Knopp | Dec. 13, 1921 |